United States Patent [19]

Saitoh et al.

[11] 4,408,795
[45] Oct. 11, 1983

[54] HINGE DEVICE FOR A DETACHABLE ROOF PANEL IN AN AUTOMOBILE

[75] Inventors: Masaaki Saitoh, Wakou; Michitada Kameoka, Musashino, both of Japan

[73] Assignee: Honda Giken Kogyo Kabushiki Kaisha, Tokyo, Japan

[21] Appl. No.: 300,636

[22] Filed: Sep. 9, 1981

[51] Int. Cl.$^3$ .............................................. B60J 7/18
[52] U.S. Cl. .................................... 296/218; 16/271
[58] Field of Search ................ 296/218, 216; 49/465, 49/463; 16/274, 271, 272

[56] References Cited

U.S. PATENT DOCUMENTS 3,955,848  5/1976  Lutz et al. ............................ 296/218
4,342,481  8/1982  Kanou et al. ....................... 296/218

*Primary Examiner*—Robert R. Song
*Attorney, Agent, or Firm*—Polster, Polster and Lucchesi

[57] ABSTRACT

An improved hinge device for a detachably attachable roof plate in an automobile, etc., wherein a draining hole is formed in one lower part of a hinge receiving member in a manner to be communicable between a hinge member inserting slot and outside, or a plurality of channels for retaining therein dust, and other foreign matters is formed in the lower surface of the hinge member inserting slot of the hinge receiving member in the direction substantially along the inserting and withdrawing direction of the hinge, or at least one discharging hole is formed in the innermost part of the hinge inserting slot of the hinge receiving member in a manner to be communicable with outside of the slot, or an opening of the hinge inserting slot of the hinge receiving member is positioned above a gutter provided around an inner peripheral brim of a roof opening by inwardly extending the gutter from said inner peripheral brim of the roof opening to form a weir on the upper edge of an inlet opening for inserting the hinge.

4 Claims, 17 Drawing Figures

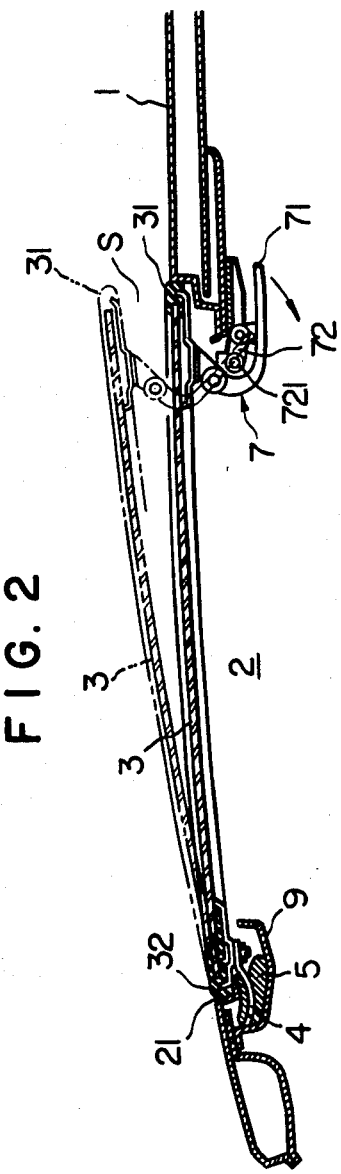
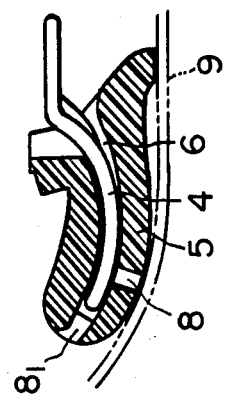
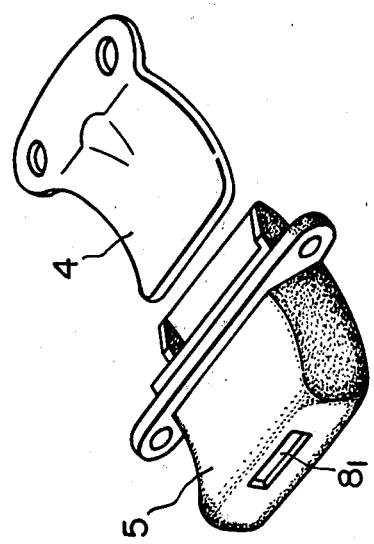
FIG. 2
FIG. 3
FIG. 4

HINGE DEVICE FOR A DETACHABLE ROOF PANEL IN AN AUTOMOBILE

BACKGROUND OF THE INVENTION (a) Field of the Invention

This invention relates to a roof component of an automobile having a detachably attachable roof panel to be fitted in an opening formed in one part of the roof component. More particularly, the invention is concerned with a hinge device consisting of a tongue-shaped hinge member provided at the front edge of the abovementioned roof panel and a hinge receiving member provided at an inner peripheral rim of the opening.

(b) Description of Prior Art

Some automobiles and other vehicles have been provided heretofore with a roof having an opening in one part for the purpose of ventilating and lighting the vehicle cabin, and the opening is covered with a detachably attachable roof panel (vide: Japanese patent publication No. 55-10408).

Explaining this in more detail, referring to FIGS. 1 and 2 of the accompanying drawing for an illustration of some of the elements common to the prior art and the roof components of the present invention, the roof panel 3, besides its attaching to, and detaching from, the roof component 1, has a hinge at an engaging part between the front edge 32 of the roof panel 3 and the inner peripheral rim 21 of the opening 2 with a view to raising the rear edge of the roof panel to a certain definite height, as shown by a double-dot-and-dash line in FIG. 2, to obtain a ventilating slit 5.

That is to say, the tongue-shaped hinge member 4 having a curvature in the lengthwise direction thereof is provided at the front edge 32 of the roof panel 3, and this hinge member 4 is slipped into an arcuate groove 6 formed in the tongue receiving member 5 provided at the inner peripheral rim 21 of the opening at a position corresponding to the hinge member 4. Further, the rear edge 31 of the roof panel 3 and the inner peripheral rim 21 of the opening are tightly joined together with a toggle type latch 7, for example.

In FIG. 2, when a lever 71 of the toggle type latch 7 is rotated in the arrow direction, a toggle arm 72 extends upward and the tongue-shaped hinge member 4 slides in and along the arcuate groove 6, whereby the rear edge 31 of the roof panel 3 raises upward as shown by the double-dot-and-dash line. When a pivot shaft 721 of the toggle arm 72 is pulled out of the ears 73 at the side of the roof 1, the rear edge 31 of the roof panel 3 is disengaged from the inner peripheral rim 21 of the opening. Further, when the roof panel 3 is pulled rearward while rotating the same upward, the tongue-shaped hinge member 4 is slipped out of the hinge receiving member 5 and the roof panel 3 is removed from the opening 2. The same hinge function can be obtained by forming the hinge member 4 in a planar shape using a resilient material, instead of forming it in an arcuate shape.

In the above-described roof panel fitting construction, a gutter or drain 9 is further provided along the lower brim of the inner peripheral brim 21 of the opening in order to receive and prevent leakage inside the vehicle cabin of rain water or car washing water which flows in between the inner peripheral rim 21 of the roof opening 2 and the detachable roof panel. The drain 9 communicates with outside of the vehicle body at its lower part through a vertical drain (not shown in the drawing).

The above-described tongue-shaped hinge member 4 works to attach and detach the roof panel 3 to and from the roof around the opening 2 by inserting and withdrawing the same into and out of the arcuate groove 6 of the hinge receiving member 5. In order, however, to maintain the hinge member in the groove so as to be readily inserted and withdrawn, the height of the groove is extremely low in conformity to the gauge or thickness of the plate for the hinge member 4. As the consequence of this, when dust, sand and mud enter into the groove 6, slipping of the hinge member is inhibited, and moreover, the member 4 is worn due to its friction with the dust and sand to cause loosening between the hinge member and the groove. Furthermore, due to the friction, the insertion and withdrawl of the hinge member become difficult. In addition, it will be apprehended that noises are generated between the hinge member 4 and the receiving member 5 due to vibrations of the vehicle body.

In the abovementioned hinge device, it happens that water which has flowed in between the inner peripheral rim 21 of the opening 2 and the front edge 32 of the roof panel 3, or water which, when the roof panel 3 is opened with water remaining on the top surface thereof, flows into the groove 6 of the hinge receiving member 5, in the cold season, is frozen to render it impossible to insert and withdraw the hinge member 4.

In the snow season, when the roof panel is to be removed from the roof opening with the snow fallen and accumulated on the roof top, it may happen that the snow on the roof panel falls and enters into the receiving groove 6 of the hinge member. Thereafter, when the tongue-shaped hinge member 4 is inserted into the groove 6 in an attempt to fit the roof panel 3 in the roof opening 2, the insertion causes the snow to be pushed inward of the groove 6 and solidified. As the result of this, the hinge member 4 cannot accurately be inserted into the innermost position of the groove 6, thereby causing inconvenience such that the roof panel 3 cannot perfectly be fitted into the roof opening 2.

It is therefore an object of the present invention to provide an improved hinge device for the detachable roof panel which has removed the afore-described various defects in the conventional detachably attachable roof panel hinge device.

SUMMARY OF THE INVENTION

According to the present invention, in one aspect thereof, there is provided a hinge device for a detachably attachable type roof plate in a vehicle, which comprises: a roof of the vehicle having an opening formed in one part thereof, the opening being defined by an inner peripheral rim; a roof plate of a size to be snugly fitted in the opening of the roof; at least one hinge member provided on the front edge of the roof plate; latching means provided on the rear edge of the roof plate; a receiving member provided on the inner peripheral rim of the roof opening to receive into a slot formed therein the hinge member; and engaging means to be engaged with said latching means on the roof plate in a disengageable manner, a draining hole being formed in one lower part of the receiving member communicating between the hinge member receiving slot and the outside.

According to the present invention, in another aspect thereof, there is provided a hinge device for a detachably attachable type roof plate in a vehicle which comprises: a roof of the vehicle having an opening formed in one part thereof, the opening being defined by an inner peripheral rim; a roof plate of a size to be snugly fitted in the opening of the roof; at least one hinge member provided on the front edge of the roof plate; latching means provided on the rear edge of the roof plate; a receiving member provided on the inner peripheral rim of the roof opening to receive into a slot formed therein the hinge member; and engaging means to be engaged with the latching means on the roof plate in a disengageable manner, a plurality of channels, for retaining therein dust and other foreign matter, formed in a lower surface of the hinge member defining a receiving slot of the receiving member in the direction substantially along the inserting and withdrawing direction of the hinge member.

According to the present invention, in still another aspect thereof, there is provided a hinge device for a detachably attachable type roof plate in a vehicle which comprises: a roof of the vehicle having an opening formed in one part thereof, the opening being defined by an inner peripheral rim; a roof plate of a size to be snugly fitted in said opening of the roof; at least one hinge member provided on the front edge of the roof plate; latching means provided on the rear edge of the roof plate; a receiving member provided on the inner peripheral rim of the roof opening to receive into a slot formed therein the hinge member at a position corresponding each other; and engaging means to be engaged with the latching means on the roof plate in a disengageable manner, at least one discharging hole formed in the innermost part of the surface defining the hinge member receiving slot of the receiving member and communicating with space outside of the slot.

According to the present invention, in another aspect thereof, there is provided a hinge device for a detachably attachable type roof plate in a vehicle which comprises: a roof of the vehicle having an opening formed in one part thereof, the opening being defined by an inner peripheral rim; a roof plate of a size to be snugly fitted in said opening of said roof; at least one hinge member provided on the front edge of said roof plate; latching means provided on the rear edge of the roof plate; a receiving member provided on the inner peripheral rim of the roof opening to receive into a slot formed therein the hinge member; and engaging means to be engaged with the latching means on the roof plate in a disengageable manner, an opening in a surface defining the hinge member receiving slot of the hinge receiving member being positioned above a gutter provided around said inner peripheral rim by inwardly extending the gutter from the inner peripheral rim of the roof opening to form a weir on the upper edge of the inlet opening for inserting said hinge member.

There has thus been outlined, rather broadly, the more important features of the present invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception, upon which this disclosure is based may readily be utilized as a basis for the designing of other structures for carrying out the several purposes of the present invention. It is important, therefore, that the claims be regarded as including such equivalent construction so far as they do not depart from the spirit and scope of the present invention.

BRIEF DESCRIPTION OF THE ACCOMPANYING DRAWING

Specific embodiments of the present invention have been chosen for the purpose of illustration and description, and are shown in the accompanying drawing, forming a part of the specification, in which:

FIG. 2 is a longitudinal cross-sectional view showing a detachably attachable roof panel fitted in the roof opening;

FIG. 3 is a perspective view showing one embodiment of tongue-shaped hinge member and receiving member;

FIG. 4 is a longitudinal cross-sectional view showing the tongue-shaped hinge member inserted into the groove of the receiving member to fit the roof panel into the roof opening;

DETAILED DESCRIPTION OF PREFERRED EMBODIMENTS

Figure 1:
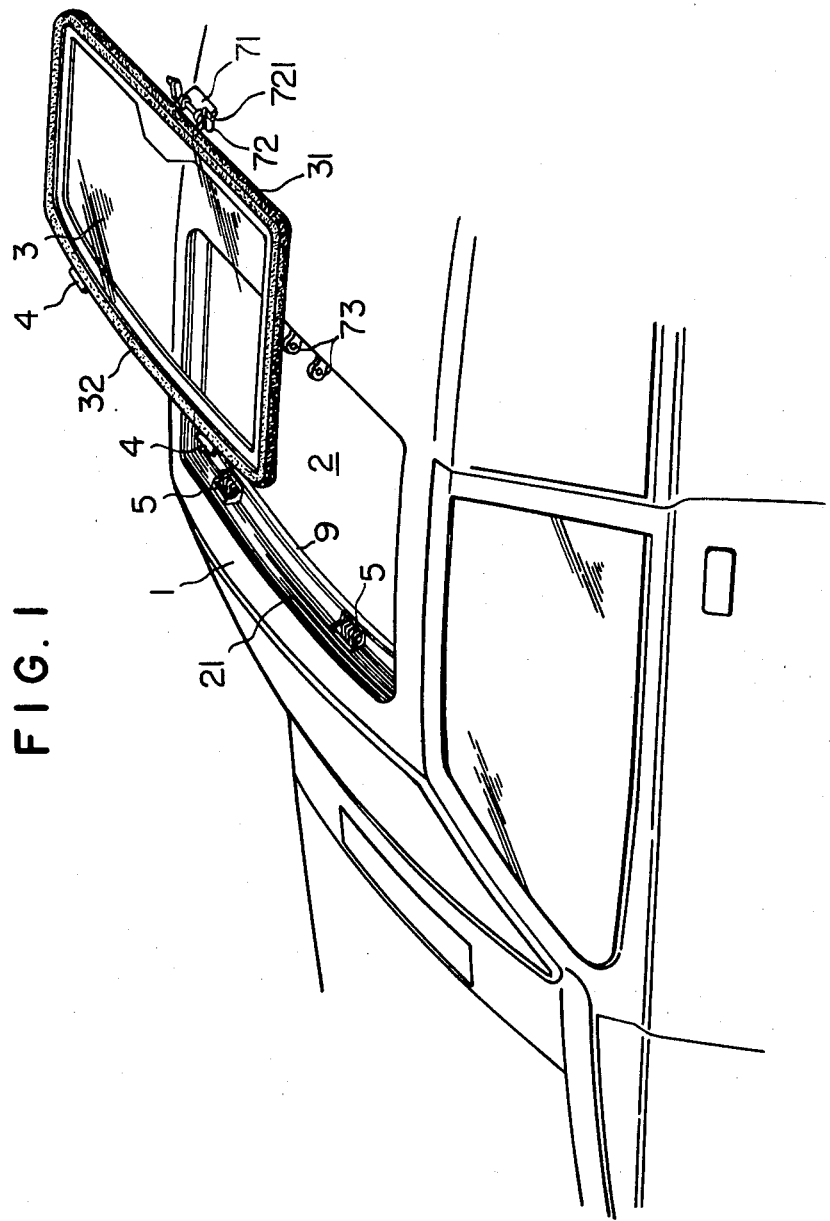
FIG. 1 is a perspective view of a roof of an automobile in which a detachably attachable roof panel has been removed from a roof opening.

In the following, the present invention will be described in detail with reference to several preferred embodiments thereof as shown in the accompanying drawing.

In the first embodiment of the present invention as shown in FIGS. 3 and 4, the hinge device is so constructed that one or more holes 8 are formed in the bottom portion of the hinge receiving member 5 to enable the hinge member receiving groove 6 to be communicable with outside so that dust, mud, sand and water introduced into the groove 6 may be discharged into the drain 9 provided below the inner peripheral rim of the roof opening 2 and outside the vehicle.

Figure 5:
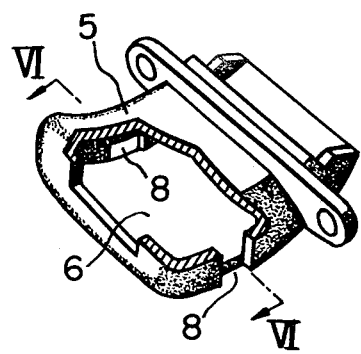
FIG. 5 is a perspective view, with a part cut away, of a modified embodiment of the hinge receiving member shown in FIG. 3.
Figure 6:
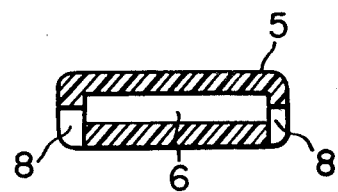
FIG. 6 is a cross-sectional view of the hinge receiving member, taken along a line VI—VI in FIG. 5.

The communicative hole 8 is formed at the lowest position or level in the wall of the arcuate groove 6 when the hinge receiving member 5 is fitted on the roof 1. One or more holes may be formed at the center portion in the longitudinal direction of the groove 6 as shown in FIG. 4; or, they may be formed in the lower portion of both side walls defining the groove as shown in FIGS. 5 and 6.

Figure 7:
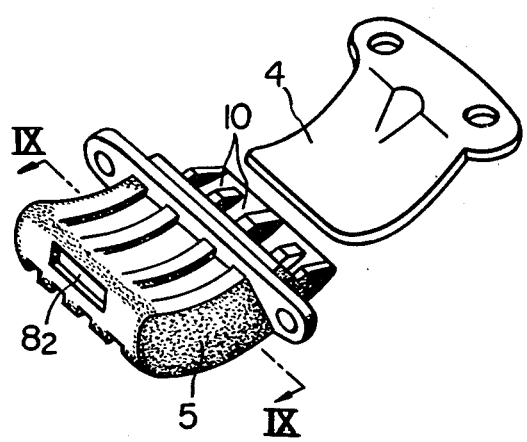
FIG. 7 is a perspective view showing another embodiment of the tongue-shaped hinge member and its receiving member.
Figure 8:
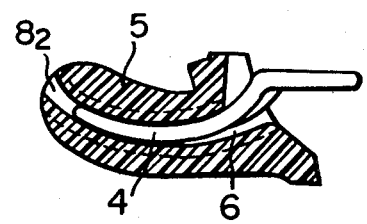
FIG. 8 is a longitudinal cross-sectional view showing the tongue-shaped hinge member inserted into the groove of the hinge receiving member to fit the roof panel into the roof opening.
Figure 9:
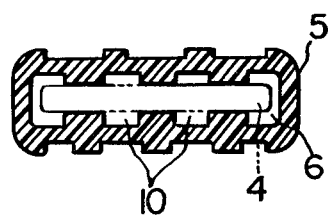
FIG. 9 is a cross-sectional view of the hinge receiving member, taken along a line IX—IX in FIG. 7.

In another embodiment of the hinge device of the present invention, shown in FIGS. 7 through 9, a plurality of channels 10 for receiving therein foreign substances such as dust, mud, sand, etc. are formed, in the direction of the insertion and withdrawal of the tongue-shaped hinge member 4, in the lower surface defining the hinge receiving groove 6 of the hinge receiving member 5.

Figure 10:
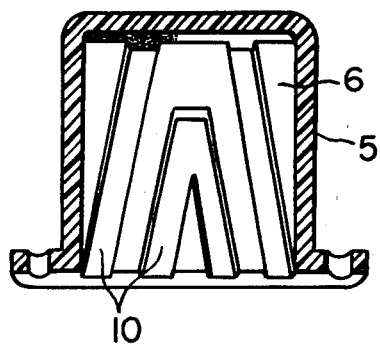
FIG. 10 is a longitudinally cross-sectioned plan view of a modified embodiment of the hinge receiving member shown in FIG. 7.

The channels 10 may be formed parallel to each other, as shown in FIG. 7, or may be formed in an arrangement as shown in FIG. 10 wherein the channels are converged onto the center part of the hinge receiving member as they extend toward the innermost part thereof.

Figure 11:
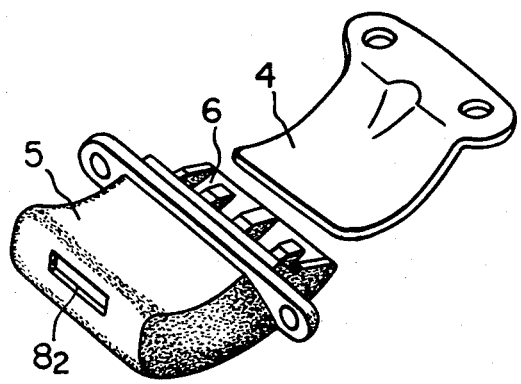
FIG. 11 is a perspective view of still another embodiment of the tongue-shaped hinge member and its receiving section.
Figure 12:
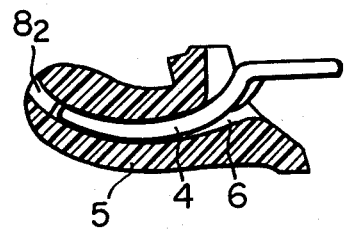
FIG. 12 is longitudinal cross-sectional view showing a state, in which the hinge member has been inserted into the hinge receiving member.
Figure 13:
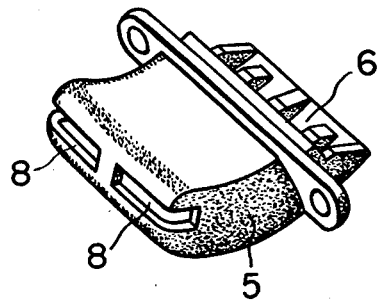
FIG. 13 is a perspective view of a modified embodiment of the hinge receiving member shown in FIG. 11.

Furthermore, in the other embodiment shown in FIGS. 11 to 13, a perforation $8_2$ which communicates between the groove 6 and the outside is formed in the wall defining the innermost part of the hinge receiving groove 6 of the hinge receiving member 5.

The perforation $8_2$ may be formed as shown in FIGS. 11 and 12 wherein a single oblong slit is formed at the center part of the hinge receiving member 5, or as shown in FIG. 13 wherein two oblong slits are formed at both sides of the hinge receiving member 5 starting from the center part thereof and extending to a lateral side thereof.

Figure 14:
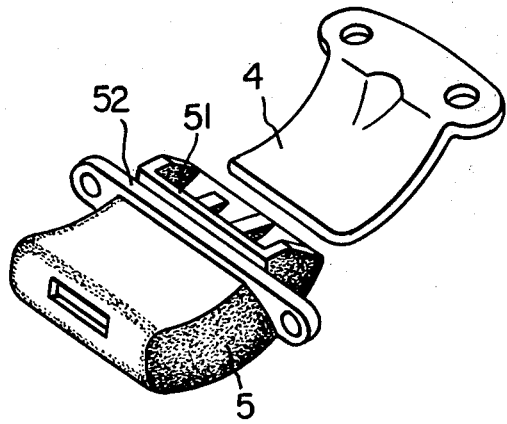
FIG. 14 is a perspective view showing other embodiment of the tongue-shaped hinge member and its receiving member.
Figure 15:
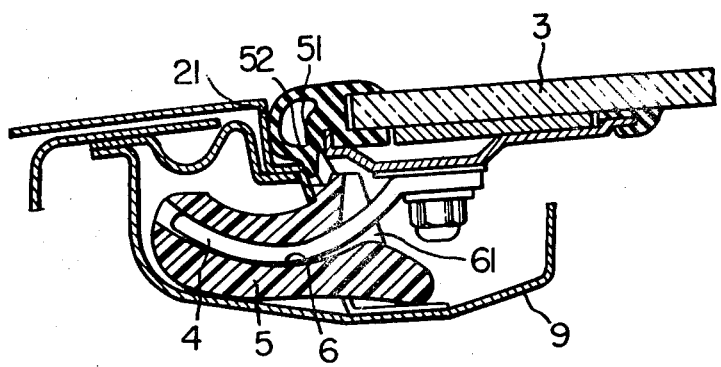
FIG. 15 is a longitudinal cross-sectional view in which the hinge member has been inserted into the hinge receiving member.
Figure 16:
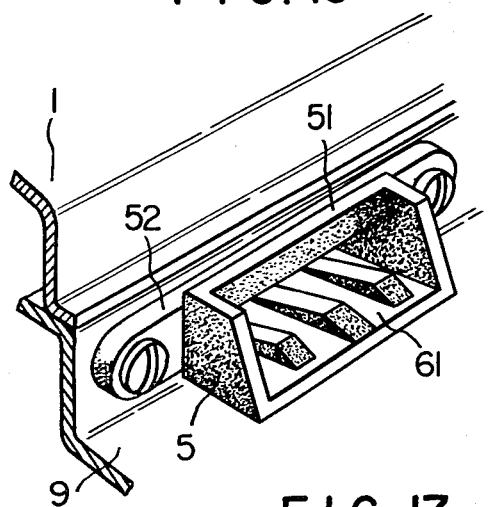
FIG. 16 is a perspective view of a modified embodiment of the hinge receiving member as seen from the side of its entrance.
Figure 17:
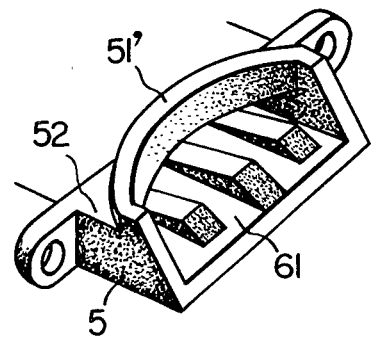
FIG. 17 is a perspective view of another modification of the hinge receiving member as seen from the side of its entrance.

In still another embodiment of the hinge device according to the present invention as shown in FIGS. 14 and 15, a receiving port 61 in the form of an apron extending from the groove 6 of the hinge receiving member 5, is projected outwardly of the inner peripheral rim 21 of the roof opening 2 to be positioned above the drain 9, and then a weir 51 is formed on the upper brim of the hinge member inserting port 61. The weir 51 is not limited to the linear shape as shown in FIGS. 14 and 16, but also it may be shaped in an arch form 51″ as shown in FIG. 17 where it is curved toward the side of the opening 2.

Incidentally, the surface 52 of the upper of the hinge member receiving port 61 should preferably be inclined toward the drain 9, the arrangement having an effect of facilitating flow of water stopped by the weir 51 to the drain 9.

Since the hinge device according to the present invention in the first embodiment thereof is so constructed as mentioned in the foregoing, rain water or car washing water flowing into the groove 6 of the hinge receiving member 5 can be caused to pass through the holes 8 and immediately discharged outside along the drain 9. Accordingly, no freezing of the water occurs in the groove 6 and insertion and withdrawal of the hinge member 4 are not hindered. In addition, dust, mud, sand, etc. entering the groove 6 are also discharged through the draining hole 8, which has the effect of constantly maintaining the hinge member 4 in good sliding condition.

Likewise, since the hinge device of the present invention as in the second embodiment thereof is so constructed as mentioned above, even when dust, mud, sand, etc. enter into the hinge member receiving groove 6 of the hinge receiving member 5, they are entrapped into the foreign substance receiving channels 10 formed in the lower surface of the groove 6 with insertion and withdrawal of the hinge member 4, so that there is no hindrance to occur in insertion and withdrawal of the hinge member. Further, since there is no wear of the hinge member 4, it can always be maintained in its good sliding condition. Moreover, since dust, mud, and sand are all retained in the foreign substance receiving channels 10, they can be readily cleared away with brushes, etc.

Further, the hinge device according to the present invention as in the third embodiment thereof is so constructed as mentioned above, even when dust, mud, sand, and snow intrude into the hinge member inserting groove 6, they can be pushed by the hinge member 4 toward the distal end of the groove 6 where they are discharged outside through the draining port 8 at the time of inserting the hinge 4 into the groove 6 so as to fit the roof panel 3 into the hinge receiving member 5. As the consequence of this, the interior of the hinge member inserting groove 6 is free from clogging of dust, mud, sand, snow, and so on, and the hinge member 4 can always be engaged at the right position to ensure accurate fitting of the roof panel 3. Also, by the discharge of these foreign substances, the hinge member 4 can always be effectively maintained in its good sliding condition.

Furthermore, the hinge device according to the present invention as in the fourth embodiment thereof is so constructed as mentioned in the foregoing, water intruded between the inner peripheral rim 21 of the roof opening and the seal 9 of the roof panel 3 is stopped by the weir 51 and does not drop into the hinge member receiving port 61. And, since the water stopped by the weir flows into the drain 9 along the upper surface 52, freezing of the water in the groove 6 of the hinge receiving member 5 can be prevented, whereby insertion and withdrawal of the tongue-shaped hinge member 4 can always be accomplished.

What is claimed is:

1. A hinge device for a detachably attachable type roof plate in a vehicle, comprising:
    (a) a roof of the vehicle having an opening formed in one part of it, said opening having an inner peripheral rim;
    (b) a roof plate of a size to be snugly fitted in said opening of said roof;
    (c) at least one hinge member provided on the front edge of said roof plate;
    (d) latching means provided on the rear edge of said roof plate;
    (e) a receiving member provided on said inner peripheral rim of said roof opening to receive into a slot formed therein said hinge member at a position corresponding each other; and
    (f) engaging means to be engaged with said latching means on said roof plate in a disengageable manner,
    a plurality of channels, for retaining therein dust, and other foreign matter, formed in the lower surface of said hinge member receiving slot of said receiving member in the direction substantially along the inserting and withdrawing direction of said hinge member.

2. A hinge device for a detachably attachable type roof plate in a vehicle, comprising:
   (a) a roof of the vehicle having an opening formed in one part thereof, said opening having an inner peripheral rim;
   (b) a roof plate of a size to be snugly fitted in said opening of said roof;
   (c) at least one hinge member provided on the front edge of said roof plate;
   (d) latching means provided on the rear edge of said roof plate;
   (e) a receiving member provided on said inner peripheral rim of said roof opening to receive into a slot formed therein said hinge member at a position corresponding each other; and
   (f) engaging means to be engaged with said latching means on said roof plate in a disengageable manner,
   an opening of the hinge member slot of said hinge receiving member being positioned above a gutter provided around said inner peripheral rim by inwardly extending the gutter from said inner peripheral rim of said roof opening to form a weir on the upper edge of said inlet opening for inserting said hinge member.

3. A hinge device for a detachably attachable type roof plate in a vehicle, comprising:
   (a) a roof of the vehicle having an opening formed in one part thereof, said opening having an inner peripheral rim;
   (b) a roof plate of a size to be snugly fitted in said opening of said roof;
   (c) at least one hinge member provided on a front edge of said roof plate;
   (d) latching means provided on a rear edge of said roof plate;
   (e) a receiving member provided on said inner peripheral rim of said roof opening to receive into a slot formed therein said hinge member, the lower reach of said slot being defined by an arcuate wall; and
   (f) engaging means to be engaged with said latching means on said roof plate in a disengageable manner,
   said arcuate wall having a draining hole formed in and extending through the lowest part of said arcuate wall, communicating between the hinge member receiving slot and the outside.

4. A hinge device for a detachably attachable type roof plate in a vehicle, comprising:
   (a) a roof of the vehicle having an opening formed in one part thereof, said opening having an inner peripheral rim;
   (b) a roof plate of a size to be snugly fitted in said opening of said roof;
   (c) at least one hinge member provided on a front edge of said roof plate;
   (d) latching means provided on a rear edge of said roof plate;
   (e) a receiving member provided on said inner peripheral rim of said roof opening to receive into a slot formed therein said hinge member; and
   (f) engaging means to be engaged with said latching means on said roof plate in a disengageable manner,
   a wall defining the innermost part of said receiving member slot having at least one discharging hole formed in and through it, said hole being positioned and opening above a gutter.

* * * * *